No. 819,014. PATENTED APR. 24, 1906.
C. W. HILLENBRAND.
PORTABLE TURN TABLE.
APPLICATION FILED NOV. 6, 1905.
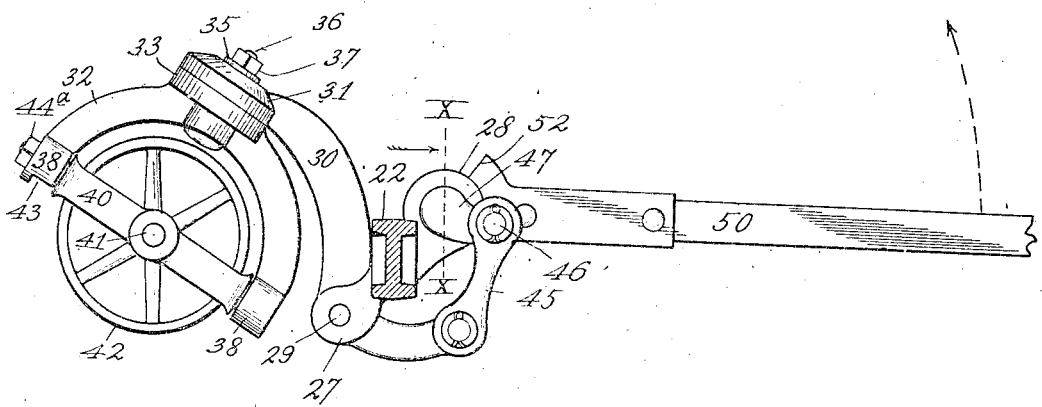
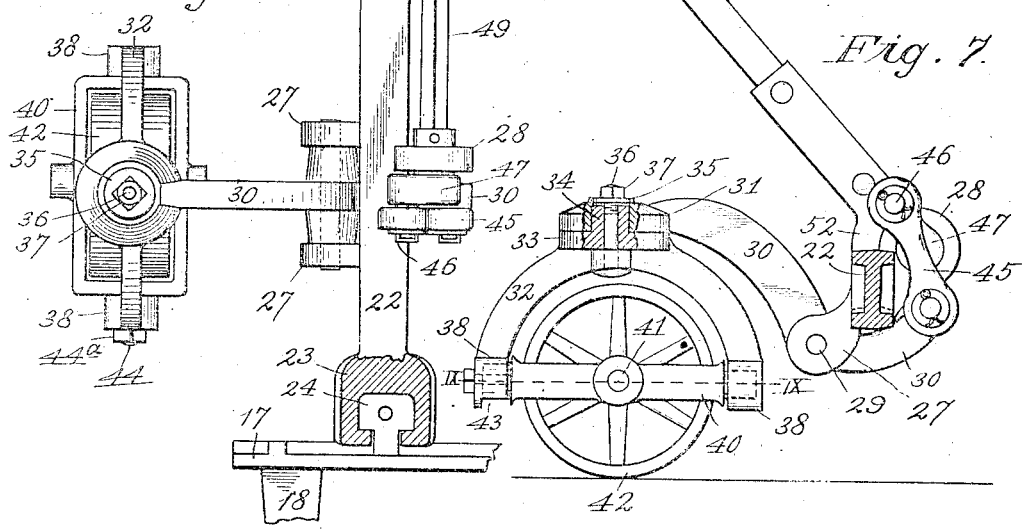
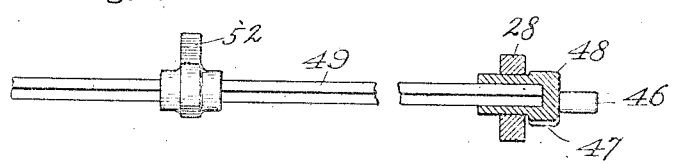

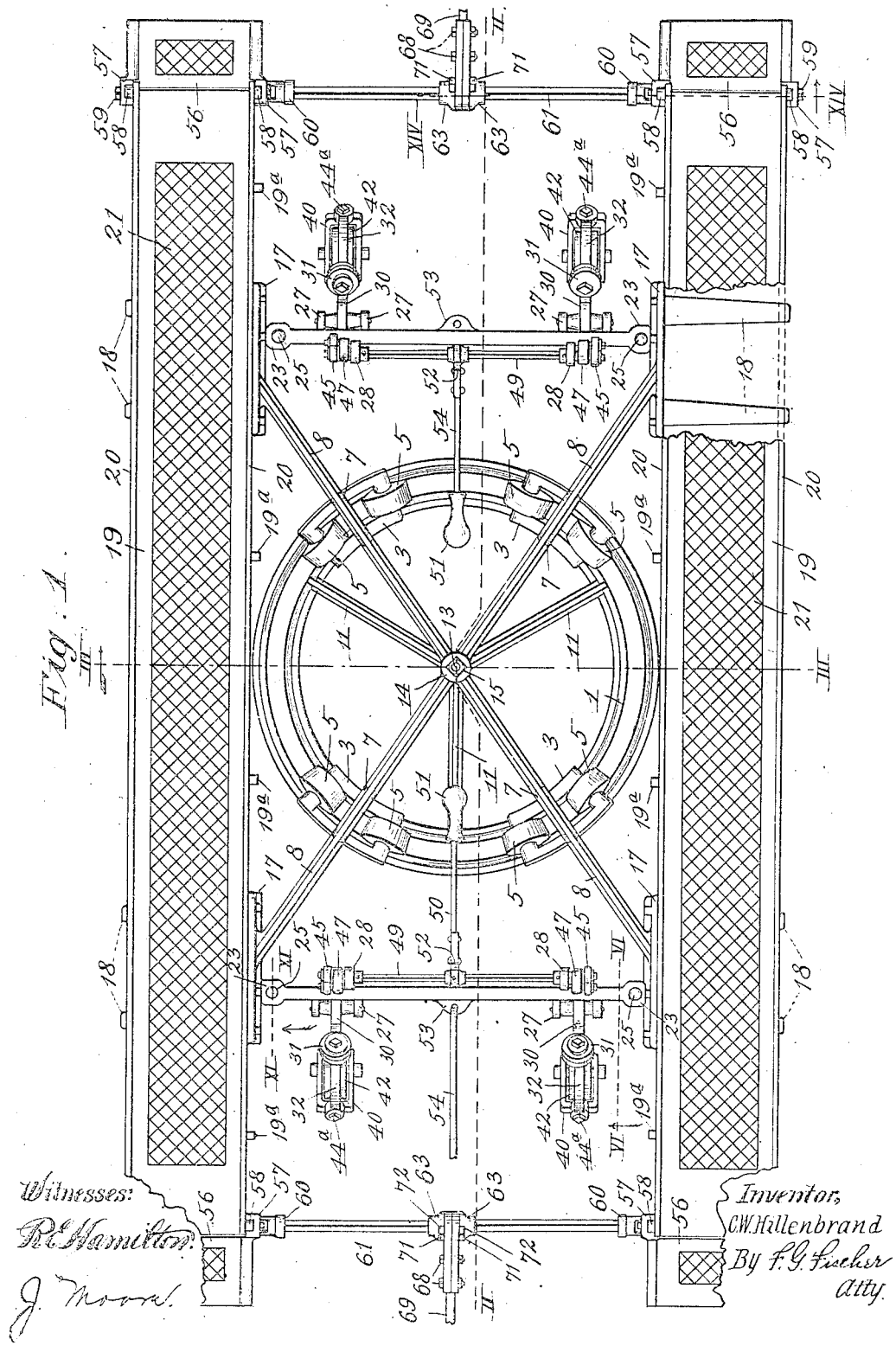

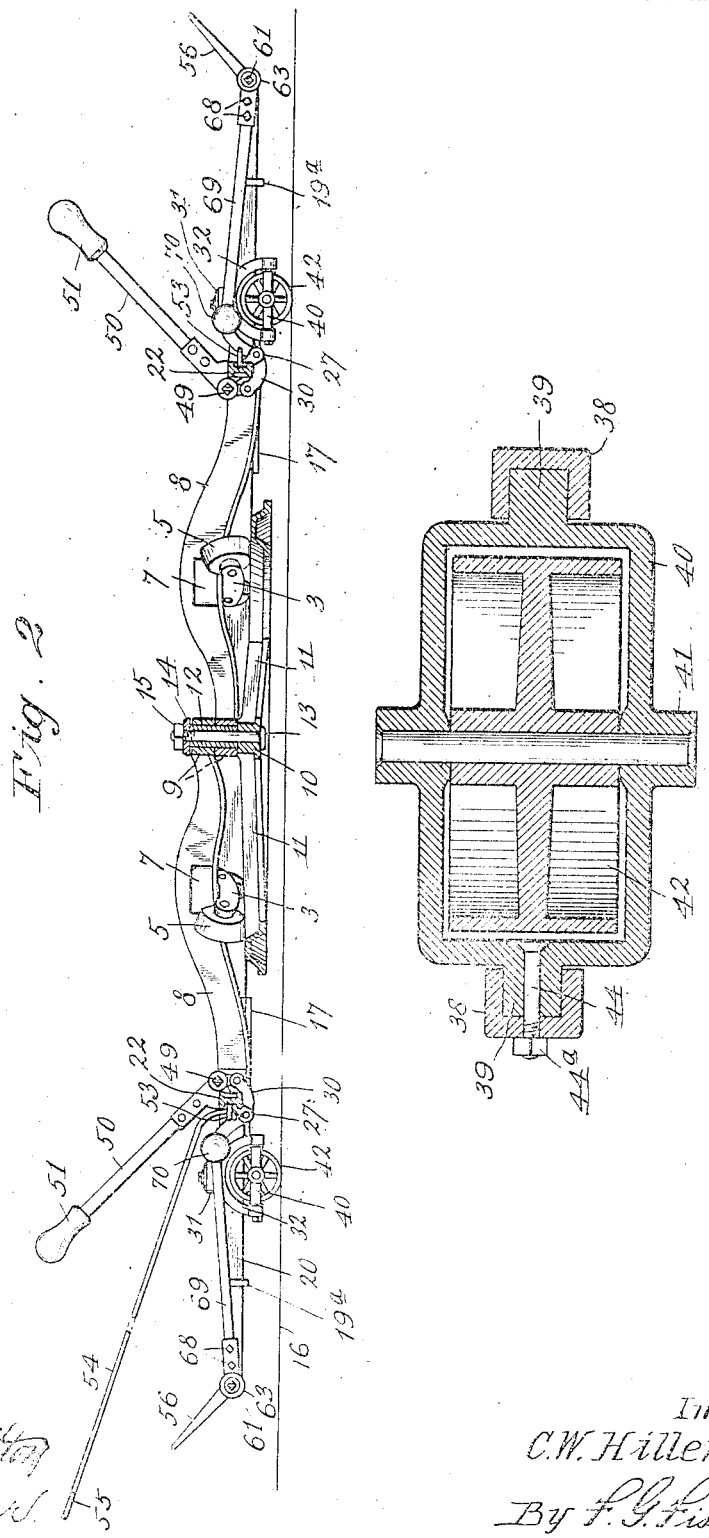

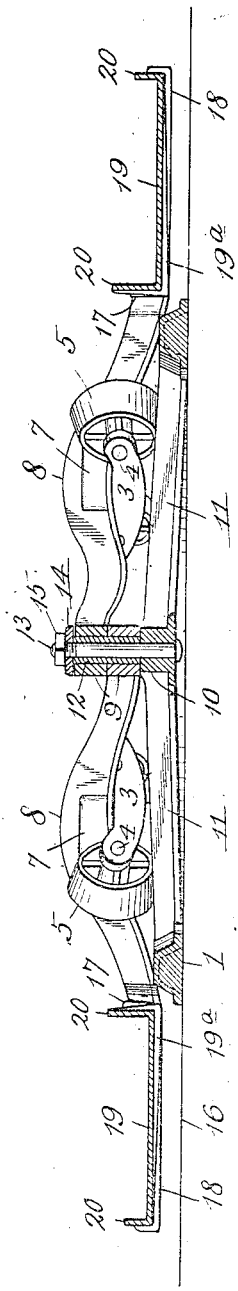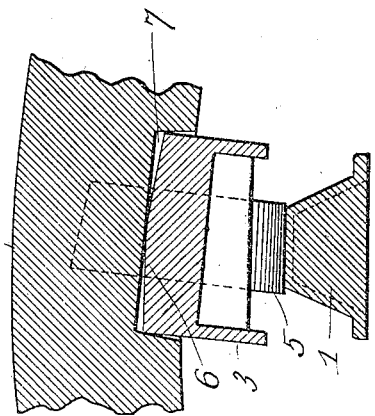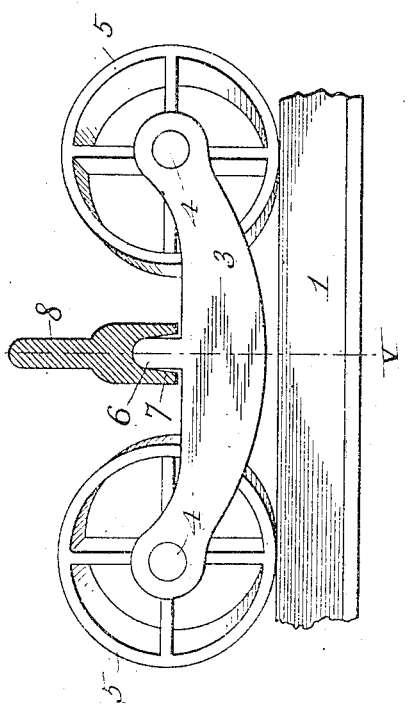

No. 819,014. PATENTED APR. 24, 1906.
C. W. HILLENBRAND.
PORTABLE TURN TABLE.
APPLICATION FILED NOV. 6, 1905.
5 SHEETS—SHEET 5.
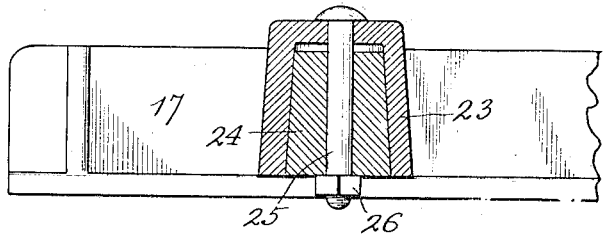
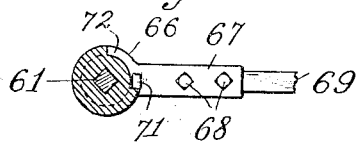
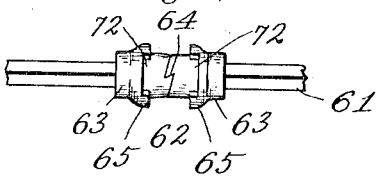
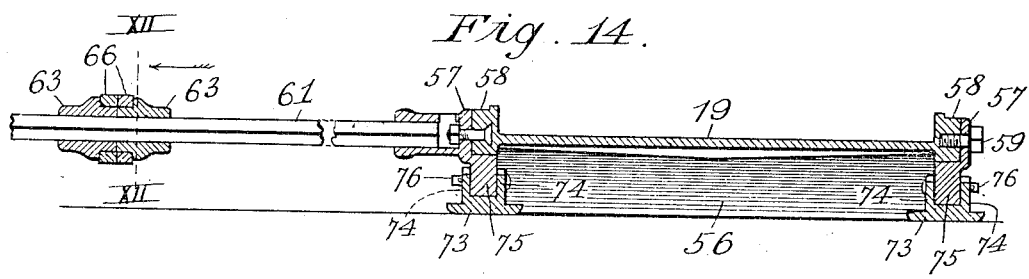
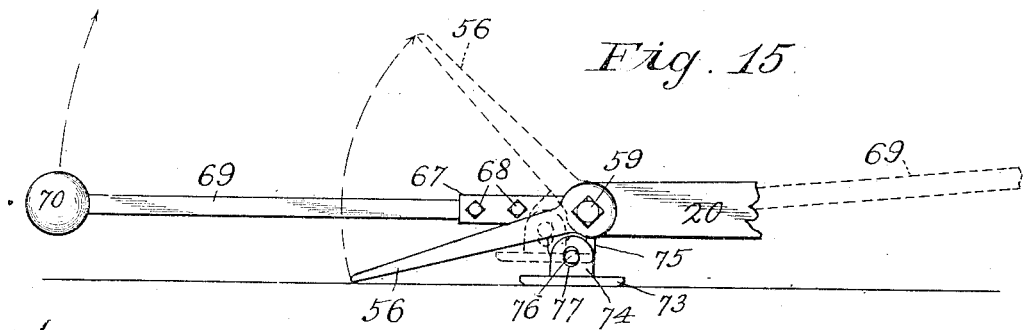
Witnesses.
R. E. Hamilton
J. Moore
Inventor,
C. W. Hillenbrand
By F. G. Fischer
Atty.

UNITED STATES PATENT OFFICE.

CHARLES W. HILLENBRAND, OF KANSAS CITY, KANSAS, ASSIGNOR OF SEVEN-EIGHTHS TO NATHANIEL C. BARNES, OF KANSAS CITY, MISSOURI.

PORTABLE TURN-TABLE.

No. 819,014.　　　Specification of Letters Patent.　　Patented April 24, 1906.

Application filed November 6, 1905. Serial No. 286,018.

*To all whom it may concern:*

Be it known that I, CHARLES W. HILLENBRAND, a citizen of the United States, residing at Kansas City, in the county of Wyandotte and State of Kansas, have invented certain new and useful Improvements in Portable Turn-Tables, of which the following is a specification.

My invention relates to improvements in portable turn-tables; and my object is to provide an appliance whereby the handling of motor-cars or other vehicles in garages and manufactories will be greatly facilitated. The turn-table being portable may be moved around at will and, as it is self-contained, may be used upon any level place or floor without cutting into or otherwise mutilating said floor. It enables the car to turn within its length, and thereby reduces the space ordinarily required for maneuvering cars. Thus the capacity of the garage is increased. It also permits the car to face the door, so that the risk and inconvenience arising from backing out of the garage is obviated.

In order that the invention may be fully understood, reference will now be made to the accompanying drawings, in which—

Figure 1 represents a plan view of my improved turn-table. Fig. 2 is an irregular longitudinal section of same, taken on line II II of Fig. 1. Fig. 3 is a central transverse section taken on line III III of Fig. 1. Fig. 4 is an enlarged side elevation of a two-wheel truck, a cross-section of a supporting-arm mounted upon said truck, and an annular track upon which the truck is mounted, all of which form part of the invention. Fig. 5 is a vertical section of same, taken on line V V of Fig. 4. Fig. 6 is a transverse section taken on line VI VI of Fig. 1, showing one of the transporting-wheels employed in carrying out the invention in an elevated position. Fig. 7 is a transverse section taken on the same plane as Fig. 6, showing the transporting-wheel in its lowered position. Fig. 8 is a plan view of same, partly in section. Fig. 9 is a longitudinal section of one of the transporting-wheels and a rectangular frame in which it is mounted, taken on line IX IX of Fig. 7. Fig. 10 is a vertical longitudinal section taken on line X X of Fig. 6, showing part of the mechanism for raising and lowering the transporting-wheels. Fig. 11 is an enlarged vertical section taken on line XI XI of Fig. 1. Fig. 12 is a transverse section taken on line XII XII of Fig. 14. Fig. 13 is a broken plan view of a shaft and a casting fixed thereon, both of which are employed in assisting to raise and lower adjustable approaches forming part of the invention. Fig. 14 is a section taken on line XIV XIV of Fig. 1. Fig. 15 is an enlarged broken side elevation of a runway, an adjustable approach pivoted thereto, a lever and counterweight for holding said approach in either its raised or lowered position, and one of a plurality of shoes for supporting the end of the runway when the latter is in its lowered position, all of which form part of the invention.

In carrying out the invention I employ a centrally-disposed track 1, preferably annular in plan view to save weight and material, upon which is mounted a plurality of two-wheel trucks 2, each of which comprises a frame 3, provided at their opposite ends with axles 4, journaled in the ends of said frame, and a pair of wheels 5, fixed upon said axles, the peripheries of said wheels being slightly conical to properly travel upon track 1.

Frames 3 are provided with centrally-disposed transverse bearings 6 for the reception of sockets 7, loosely fitting over said bearings, so that the wheels of the trucks may readily accommodate themselves to any slight irregularities which may exist in the surface of track 1 and so the load will be equally distributed upon each of said wheels. Sockets 7 are formed in the under sides of a pair of diagonally-arranged supporting-arms 8, crossing each other at their central portions, which are provided with hubs 9, one of which rests upon the other, as shown in Fig. 3. The lowermost hub rests upon a hub 10, connected to track 1 by radial arms 11. Hubs 9 are held in vertical alinement by means of a bushing 12, resting upon the upper surface of hub 10 and held in vertical alinement with the latter by means of a king-bolt 13, extending upwardly through hub 10 and the bushing and provided at its upper threaded end with a washer 14 and a clamping-nut 15. In order to prevent the washer from being forced into frictional contact with the upper hub 9 by means of the clamping-nut, I extend the bushing slightly above said hub, as shown in Fig. 3. Thus while the parts are reliably held together hubs 9 will be free to rotate upon the bushing and hub 10. The outer ends of arms 8 extend downwardly to within a short distance of the floor-line 16 and are provided with longitudinal flanges 17, each of which has a pair of laterally-extending fingers 18, upon which are secured a pair of parallel runways 19. Each runway is made considerably wider than the tires of ordinary vehicles, so they may accommodate vehicles having axles of different lengths. Thus when a vehicle with long axles is placed upon the runways the tires will rest near the outer edges of the same, and when a vehicle with short axles or of narrow gage is placed upon the runways the tires will come close to the inner edges of said runways. The runways are reinforced at their opposite sides with flanges 20, which also act as guides in preventing the vehicle from running off said sides, and in order that the vehicle may be readily stopped at the proper position upon the runways I roughen the upper surfaces of the latter, as shown at 21. The runways are further reinforced by equally-spaced transverse ribs 19$^a$. The ends of arms 8 are united in pairs, and thus held from swinging toward or away from each other by means of transverse bars 22, provided at their enlarged ends with downwardly-flaring sockets 23 for the reception of bosses 24 integral with the inner sides of flanges 17. Bosses 24 are reliably held in the sockets by means of bolts 25 and clamping-nuts 26. Bars 22 are provided near their ends with outwardly-projecting ears 27 and inwardly-projecting ears 28. Ears 27 are provided with transverse pins 29, upon which are fulcrumed irregular-shaped levers 30, provided at their outer ends with enlarged circular bearings 31.

32 designates four yokes provided at their upper portions with circular bearings 33, preferably of the same diameter as bearings 31, against the under sides of which they abut to prevent the yoke from tipping over. Bearings 33 have centrally-disposed upwardly-extending spindles 34, extending through central openings in bearings 31, to which latter they are pivotally secured by means of washers 35, bolts 36, and clamping-nuts 37, which engage the threaded upper ends of the bolts. In order to prevent the washers from being forced into frictional contact with bearings 31 by the clamping-nuts, and thus preventing the spindles from turning freely in said bearings, I extend the spindles slightly above the same, as shown in Fig. 7. Yokes 2 are provided at their lower ends with sockets 38 for the reception of trunnions 39, pivoted therein and formed integral with the opposite ends of rectangular frames 40, provided with centrally-disposed axles 41, upon which are fixed transporting-wheels 42. The bearing-points of wheels 42 are out of vertical alinement with the centers of spindles 34, so that said transporting-wheels will automatically follow the line of draft when the turn-table is moved, acting in this respect like caster-wheels. In order that each frame 40 may be readily secured to its respective yoke, I provide one of the sockets of the latter with a slot 43 for the passage of the adjacent trunnion 39 after the trunnion at the opposite end of the frame has been introduced into its socket. The first-mentioned trunnion is then removably secured in its slotted socket by means of a bolt 44 and nut 44$^a$. By thus pivotally mounting frames 40 in the yokes the spindles 44 will be relieved to a certain extent of the bending strains to which they are subjected when the transporting-wheels are traveling over an uneven surface.

45 designates four links pivotally secured at their lower ends to the inner ends of levers 30 and at their upper ends to the outturned terminals 46 of crank-arms 47, fixed upon the outer ends of sockets 48, fitting over the ends of two square shafts 49, sockets 48 being journaled in ears 28, so that said shafts may be turned when it is desired to raise or lower the transporting-wheels. Shafts 49 are operated with centrally-disposed hand-levers 50, provided at their free ends with counterweights 51 and at their fixed ends with shoulders 52, which latter contact with the upper surface of bars 22 after the transporting-wheels have been lowered to the floor, as shown in Figs. 2 and 7, and thus hold said wheels in their lowermost position.

53 designates ears centrally disposed upon the transverse bars 22 for the reception of the hooked end of a draft-rod 54, provided at its free end with a loop 55, which affords a convenient handhold when it is desired to move the turn-table. By providing said draft-rod with a hooked end it may be readily detached from one ear and inserted in the other. Thus the turn-table may be readily moved in any direction.

56 designates a plurality of adjustable approaches, one of which is preferably located at each end of each runway, as shown in Fig. 1. Said approaches when occupying one position form inclined planes, over which a vehicle may be readily moved upwardly from the floor to the runways, and each approach is provided at its pivoted end with a pair of oppositely-disposed sockets 57 for the reception of trunnions 58, one pair of which is located at each end of the runways. Sockets 58 are held in position upon the trunnions by screws 59.

60 designates sockets extending inwardly from the inner set of sockets 57 for the reception of the opposite ends of a pair of square shafts 61, each of which is provided with a centrally-disposed fixed casting 62, comprising two sections 63, having interlocking ends 64 and integral flanges 65, between which latter the annular ends 66 of two plates 67 are pivotally mounted. Plates 67 when secured together by bolts 68 form sockets for the inner ends of hand-levers 69, held therein by said bolts and provided at their free ends with counterweights 70, each of which is adapted to hold its respective pair of approaches either in a raised or lowered position. It is desirable that levers 69 assume substantially a horizontal position when occupying either of the positions shown by full and dotted lines, Fig. 15, in order that their counterweights will more reliably hold the approaches in either of their respective positions; so I provide means whereby said levers may be swung through a greater arc than the approaches. Said means consist of lugs 71, projecting laterally from plates 67 into recesses 72 in flanges 65. This permits levers 69 to swing independently of castings 62 until the lugs 71 contact with the shoulders forming the ends of the recesses, when, of course, they swing together the remainder of the distance and carry the approaches therewith.

73 designates a plurality of shoes, one pair of which is arranged beneath each end of the runways. Each shoe is provided with a pair of upwardly-extending ears 74, embracing the opposite sides of lugs 75, depending from the under side of sockets 57, the shoes being loosely secured to the lugs by pins 76, extending through slots 77 in the ears. By thus slotting the ears the lugs will bear upon the shoes when the latter are resting upon the floor, and thus relieve pins 76 of all weight, said pins being provided merely for the purpose of raising the shoes from the floor with the approaches. (See dotted lines, Fig. 15.)

In operation the approaches and the shoes are adjusted to their lowermost positions by throwing levers 69 outwardly (see full lines, Fig. 15) in order that the ends of the runways may be supported by said shoes. The transporting-wheels are then raised from the floor by throwing levers 50 to the position indicated by full lines, Fig. 6. This operation lowers track 1 to the floor, so that the entire weight of the turn-table will be supported by said track, trucks 2, and the shoes. The motor-car or other vehicle is then run over the approaches and onto the runways. The runways, with the vehicle, may then be turned, as upon a pivot, toward any objective point after the approaches and the shoes have been raised from the floor, so that the entire load will be carried by trucks 2 and track 1. The transporting-wheels need only be lowered when it is desired to move the turn-table from place to place, and when occupying their lowermost position the shoes, approaches, and the track will of course be raised from the floor, as shown in Fig. 2.

The parts are detachable and interchangeable, so they may be readily repaired or replaced when worn out, and by making the turn-table in skeleton form, as illustrated, all needless weight and material are dispensed with.

While I have described the invention as a portable turn-table, I do not wish to be limited to this construction, as it could of course be readily converted into a stationary one by dispensing with the transporting-wheels and the means for operating the latter. The adjustable approaches, while desirable, could also be dispensed with by arranging the ends of the runways close enough to the floor to permit the vehicle to easily run upon said runways, and when so arranged the shoes could also be omitted.

Having thus described my invention, what I claim, and desire to secure by Letters Patent, is—

1. A turn-table consisting of a centrally-disposed track, trucks arranged to travel in a circle thereon, supporting-arms carried by the trucks, and a pair of runways carried by said arms.

2. A turn-table consisting of a centrally-disposed annular track, trucks arranged to travel in a circle thereon, supporting-arms carried by the trucks, and a pair of runways carried by said arms.

3. A turn-table consisting of a centrally-disposed track, trucks arranged to travel in a circle thereon, diagonally-arranged supporting-arms carried by the trucks, and a pair of runways carried by said arms.

4. A turn-table consisting of a centrally-disposed track, trucks arranged to travel in a circle thereon, diagonally-arranged supporting-arms carried by the trucks, transverse bars uniting said arms in pairs, and a pair of runways carried by said arms.

5. A turn-table consisting of a centrally-disposed track, trucks arranged to travel in a circle thereon, supporting-arms carried by the trucks and pivotally secured to the center of the track, and a pair of runways carried by said arms.

6. A turn-table consisting of a centrally-disposed track, trucks arranged to travel in a circle thereon, supporting-arms carried by the trucks, a pair of runways carried by said arms, and inclined approaches at the ends of said runways.

7. A turn-table consisting of a centrally-disposed track, trucks arranged to travel in a circle thereon, supporting-arms carried by the trucks, a pair of runways carried by said arms, and adjustable approaches pivoted to the ends of said runways.

8. A turn-table consisting of a centrally-disposed track, trucks arranged to travel in a circle thereon, supporting-arms carried by the trucks, a pair of runways carried by said arms, adjustable approaches pivoted to the ends of said runways so that said approaches may be raised or lowered, and means for reliably holding said approaches either in a raised or lowered position.

9. A turn-table consisting of a centrally-disposed track, trucks arranged to travel in a circle thereon, supporting-arms carried by the trucks, a pair of runways carried by said arms, and transporting-wheels suitably secured to the turn-table.

10. A turn-table consisting of a centrally-disposed track, trucks arranged to travel in a circle thereon, supporting-arms carried by the trucks, a pair of runways carried by said arms, transporting-wheels suitably secured to the turn-table, and means for raising and lowering said transporting-wheels, substantially as described.

11. A turn-table consisting of a centrally-disposed track, trucks arranged to travel in a circle thereon, supporting-arms carried by the trucks, a pair of runways carried by said arms, adjustable approaches pivoted to the ends of said runways, and shoes for supporting the ends of said runways.

12. A turn-table consisting of a centrally-disposed track, trucks arranged to travel in a circle thereon, supporting-arms carried by the trucks, a pair of runways carried by said arms, transporting-wheels suitably secured to the turn-table, and a draft-rod detachably secured to the turn-table.

13. A turn-table consisting of a pair of runways, supporting-arms carrying said runways, trucks carrying the supporting-arms, an annular track upon which said trucks are mounted, a centrally-disposed hub, radial arms connecting the hub to the track, and a king-bolt pivotally securing the supporting-arms to the hub.

14. A turn-table consisting of a track, trucks arranged to travel in a circle thereon, diagonally-arranged supporting-arms mounted upon said trucks and crossing each other at their central portions, hubs integral with said central portions, a king-bolt pivotally securing said hubs to the center of the track, longitudinal flanges at the ends of the supporting-arms, fingers extending laterally from said flanges, and runways carried by said fingers.

15. A turn-table consisting of a track, trucks arranged to travel in a circle thereon, bearings on said trucks, supporting-arms carried by the trucks and provided with sockets which loosely fit the bearings, and runways carried by said arms.

16. A turn-table consisting of a centrally-disposed track, trucks arranged to travel in a circle thereon, supporting-arms carried by the trucks, a pair of runways carried by said arms, and guides integral with the opposite sides of said runways.

17. A turn-table consisting of a centrally-disposed track, trucks arranged to travel in a circle thereon, supporting-arms carried by the trucks, a pair of runways carried by said arms, longitudinal flanges integral with the supporting-arms, bosses on said flanges, and a pair of transverse bars provided at their ends with sockets which receive said bosses.

18. In a turn-table, a track, runways rotatably mounted thereon, levers fulcrumed to the turn-table, yokes pivotally secured to said levers, frames suitably secured to said yokes, transporting-wheels mounted in said frames, and means for operating the levers so that the transporting-wheels may be lowered to support the turn-table, or raised so that the track will support said turn-table.

19. In a turn-table, a track, runways rotatably mounted thereon, levers fulcrumed to the turn-table, yokes pivotally secured to said levers, frames pivotally secured to said yokes, transporting-wheels mounted in said frames, and means for operating the levers so that the transporting-wheels may be lowered to support the turn-table, or raised so that the track will support said turn-table.

20. In a turn-table, a track, runways rotatably mounted thereon, levers fulcrumed to the turn-table, yokes pivotally secured to said levers, frames suitably secured to said yokes, transporting-wheels mounted in said frames, links pivotally secured to the levers, crank-arms pivotally secured at their free ends to said links, shafts secured to said crank-arms, hand-levers secured to said shafts, and counterweights secured to said hand-levers, for the purpose described.

21. In a turn-table, a plurality of levers fulcrumed thereto, circular bearings integral with said levers, a plurality of yokes, circular bearings integral with said yokes and abutting against the bearings on the levers, upwardly-extending spindles on the yoke-bearings pivotally secured to the lever-bearings, horizontal frames, trunnions projecting from the ends of said frames and pivotally secured in the ends of the yokes, transporting-wheels mounted in the frames, and means for operating the levers so that said wheels may be raised or lowered, substantially as described.

22. In a turn-table, a pair of approaches pivotally secured thereto, a shaft fixed at its ends to said approaches, a hand-lever for operating said shaft, and means interposed between the shaft and the hand-lever whereby the initial movement of the latter will be independent of the former.

23. In a turn-table, a pair of approaches pivotally secured thereto, a shaft fixed at its ends to said approaches, a casting fixed on said shaft, a pair of flanges on said casting having recesses, and a lever pivotally secured to the casting and provided with lugs which fit loosely in the recesses so that the initial movement of the lever will be independent of the casting.

24. In a turn-table, a pair of parallel runways rotatably mounted, a plurality of shoes for supporting the ends of said runways, and means for raising said shoes preparatory to rotating the runways.

25. In a turn-table, a pair of parallel runways rotatably mounted, means for raising and lowering said runways, and shoes for supporting the ends of the runways when the latter are in their lowermost position.

26. In a turn-table, a pair of runways rotatably mounted, approaches adjustably secured to the ends of said runways so they may be raised and lowered, and shoes for supporting the ends of the runways, said shoes being carried by the approaches so they will be raised and lowered therewith.

27. In a turn-table, a pair of runways rotatably mounted, approaches adjustably secured to the runways so they may be raised and lowered, lugs depending from said approaches, a plurality of shoes, and ears on said shoes pivotally secured to said lugs.

In testimony whereof I affix my signature in the presence of two witnesses.

CHARLES W. HILLENBRAND.

Witnesses:
   J. MOORE,
   F. G. FISCHER.